Sept. 16, 1930. H. HARRIS 1,775,676
SEPARATION OF OXYSALTS FROM ALKALI MIXTURES CONTAINING SAME
Filed Aug. 3, 1925
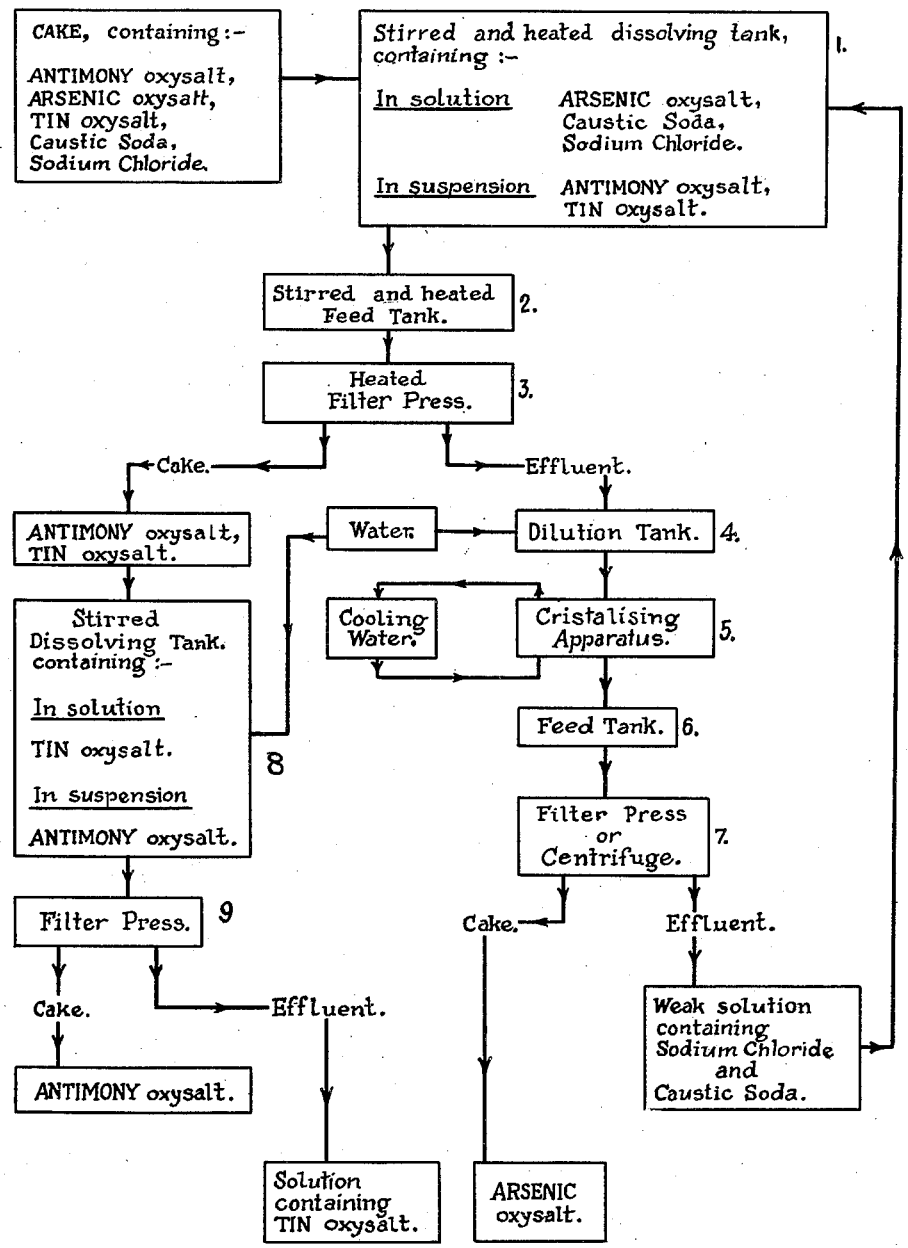
INVENTOR
Henry Harris
BY
Ward Crosby + Neal
ATTORNEY Patented Sept. 16, 1930

1,775,676

UNITED STATES PATENT OFFICE

HENRY HARRIS, OF LONDON, ENGLAND

SEPARATION OF OXYSALTS FROM ALKALI MIXTURES CONTAINING SAME

Application filed August 3, 1925, Serial No. 47,960, and in Great Britain August 8, 1924.

This invention relates to separation of oxysalts from an alkali mixture containing same, and the invention is especially useful for the fractional separation or recovery of two or more of the oxysalts of arsenic, tin and antimony; the arsenic and tin, according to the invention, being separated from the mixture by fractional crystallization, i. e., by bringing the mixture or solution as the case may be, to a concentration at which one of these oxysalts may be separated without the other, and then bringing the remaining solution to a different concentration at which the remaining oxysalt may be rendered insoluble and separated.

The invention is particularly useful in the separation of such oxysalts from a mix or matte resulting from treating impure lead or leady alloys by the use of alkali such as caustic soda with or without sodium chloride, this resulting mix or matte containing alkali and impurities from lead or leady alloys such for example as arsenic, tin and antimony, and also sodium chloride when same is used with the caustic soda. The invention, however, is not to be limited to the separation of the oxysalts from a mixture thus derived, but is useful for the separation of such ingredients as arsenic, tin and antimony from other mixtures in which they may be found.

The figure is a flow sheet diagram illustrating, by way of example, one of the various ways of carrying out my invention.

As is known from a prior invention of mine as disclosed in my U. S. Patent No. 1,573,830, for refining lead, an efficient method of treating impure lead is to maintain the molten lead at a temperature not exceeding about 500° C. and circulating the same through a molten reagent or reagent mixture consisting of caustic soda with or without sodium chlorid to which is gradually added a solid oxidizing agent such as sodium nitrate, until one or more of the impurities such as arsenic, tin and antimony have been removed from the lead and are found in the resulting alkali mix.

As disclosed in my U. S. Patent No. 1,674,642, for separation of ingredients from an alkali mixture containing oxysalt of arsenic and/or oxysalt of tin, the above referred to alkali mix or spent reagent or any alkali mix consisting of caustic soda and the metallic impurities such as arsenic, tin and antimony, may be treated so as to separate substantially the whole of the tin and arsenic in a single operation as a bulky crystalline mass of sodium oxysalts by cooling a hot aqueous solution of the spent reagent of a particular concentration, the antimony oxysalt remaining for the most part insoluble when preparing the solution and being separated from the solution as by decantation or filtration before the separation of the tin and arsenic. As further disclosed in said last application, the removal of substantially the whole of the oxysalt of tin and oxysalt of arsenic from the caustic soda containing both, may be insured by establishing the proportion of 3 parts by weight of arsenic to one of tin. In this way the removal of arsenic and tin oxysalts can be substantially completely effected with a comparatively wide range of solution strengths.

In some cases, however, the amount of arsenic initially present or even available may be so small, as to render the foregoing method of separating tin inconvenient.

According to one feature of the present invention, I separate oxysalt of tin from the spent reagent containing much tin in proportion to the arsenic present by one or another of the ways hereinafter specified, such methods being based upon the fact discovered by me that sodium oxysalt of tin is for the most part insoluble in hot caustic soda solutions of certain strengths and substantially insoluble in the same when cooled, and upon the further facts that arsenic is substantially soluble at such strengths but is substantially insoluble in cold solutions of caustic soda of somewhat lower concentrations in which oxysalt of tin is to a large extent soluble.

According to a further feature of the invention based on the same discovery, the oxysalts of tin and arsenic are fractionally separated from the alkali solution by evaporation and/or dilution, and crystallization.

The invention consists in the novel methods hereinafter described according to the preferred manner of practicing the same.

The objects and advantages of the invention will more fully appear from the following description of certain preferred ways of practicing the methods.

One way of carrying out the invention is to bring the solution of the reagent containing the said oxysalt of tin and arsenic to such a concentration that the oxysalt of tin will be totally insoluble in the solution on cooling whilst most of the arsenic will remain soluble, and in then cooling the solution and thereby separating out the oxysalt of tin.

In carrying out the invention as above indicated I may bring the solution of spent caustic reagent containing sodium stannate and some arsenate to a concentration (in caustic soda) at which the sodium stannate is insoluble on cooling the solution whilst most of the arsenic will remain soluble and thereupon I cool the solution and separate the insoluble stannate. Where the solution does not contain sodium chloride an appropriate strength (the preferred strength for uses that I have made of the invention) is one where the free caustic soda is present in the solution to the extent of about 508 grams per litre of mother liquor. Where sodium chloride is present to saturation, the best strength of solution (for uses that I have made of the invention) is one where caustic soda is present to the extent of 400 grams per litre. In either case a solution strength of 500 grams of caustic soda per litre will give practical working results.

Alternatively I may first bring the solutions of the spent reagent to such a degree of concentration that the sodium arsenate will crystallize out on cooling with only very little stannate and after removing such arsenate I then concentrate as above described to render the stannate totally insoluble on cooling. A suitable concentration for separating the arsenate is that represented by about 280 grams of caustic soda and 124 grams of sodium chloride per litre.

While I have given certain concentrations which have been found satisfactory in the carrying out of the invention for certain uses to which it has been put, it will be understood by those skilled in the art that various factors which enter into the matter make it impossible to give any definite concentration which will be most suitable under all possible conditions to be met with in practice; but the most desirable concentrations can be determined in any case and I do not wish to be understood as limiting myself in connection with the broader aspects of the invention, to the concentrations above given.

According to a further alternative I may first separate the stannate and afterwards the arsenate by bringing the spent reagent to a concentration at which the stannate is for the most part insoluble in the hot solution (for example, that above given for the insolubility of stannate) so as to enable the stannate to be separated and then cooling the remaining liquid after diluting the same to the above mentioned degree of concentration for the insolubility of arsenate, at which the whole of the arsenate and any remaining stannate will crystallize out. After separating the last crystals from the solution I dissolve the same and treat the solution in any known manner for separation of the stannate from the arsenate, e. g., by heating with calcium carbonate or by partial acidification with nitric or sulphuric acid.

Instead of diluting the hot solution immediately after separating the stannate I may of course cool the solution before diluting whereby the remaining stannate will crystallize out possibly with a little arsenate and can be removed before diluting to separate the main body of the arsenate.

As will be understood from the specification of my above-mentioned U. S. Patent No. 1,674,642, where antimony with or without arsenic is present with a quantity of tin in excess of that which is soluble in hot caustic soda solutions of the correct strength (that mentioned in my last mentioned application, i. e., 350 grams of caustic soda per litre when sodium chloride is present) it is preferable to cool the entire mass and to filter or otherwise separate all of the oxysalts together from the alkali solution. Or in other cases where antimony is present, I may filter from the solution while hot and at the above-mentioned concentration for the separation of tin, i. e., a concentration of about 500 grams of caustic soda per litre, the insoluble antimony and tin oxysalts and leave the soluble arsenic (if present) and comparatively small quantities of tin in the caustic solution which may then be diluted and cooled as above described for the separation of the arsenic and the remaining tin. Should I, as is possible, have the hot solution before filtering at a slightly lower concentration than that best suited for the separation of tin there will of course be more tin left in the filtrate but in such case, it will be unnecessary to dilute the filtrate in order to crystallize out the arsenic.

By way of example, I give below a flow sheet description of one of the various ways of carrying out my invention, this description being given in connection with the diagram, the figure, illustrating the same.

*Flow sheet*

The oxysalt mixture will generally contain the oxysalts of arsenic, tin and antimony, as well as caustic soda and sodium chloride. The oxysalt of antimony is, for all practical purposes, quite insoluble throughout the operations to be described, and its solubility is unaltered by the changes in concentration which are used to effect a separation of the oxysalts of arsenic and tin.

The oxysalt mixture is fed by suitable means, such as for instance by granulation in the molten state, into a stirred and heated dissolving tank 1. The addition of oxysalt mixture to tank 1 is continued until the desired concentration is reached. As stated, this concentration will depend on various factors, but for practical working purposes a solution strength of 500 grams per litre of caustic soda will give satisfactory results. The contents of tank 1 are then transferred to tank 2 which is stirred and heated and serves as a feed tank for a heated filter press 3. The cake resulting from this hot filtration contains the insoluble oxysalts of tin and antimony, and is passed into a stirred dissolving tank 8, where it is treated with sufficient water to dissolve out the tin oxysalt. The solution mass is then filtered in a filter press 9. The cake from this operation will consist of the antimony oxysalt, while substantially all of the original tin oxysalt will be contained in solution in the effluent. This effluent solution may be further treated for recovery of its tin contents by known means, such for example as by precipitation with calcium carbonate.

The effluent from filter press 3 will contain the oxysalt of arsenic in solution, and passes to a dilution tank 4, where it is diluted with water to a concentration at which substantially all of the oxysalt of arsenic will be crystallized out on cooling. A most suitable concentration for this purpose is, as stated, that represented by about 280 grams of caustic soda and 124 grams of sodium chloride per litre. From tank 4 the solution passes through suitable cooling apparatus, where substantially all of the oxysalt of arsenic crystallizes out, into a tank 6. From here the mixture passes through either a filter press or a centrifuge 7. The cake from this treatment will contain substantially all of the original oxysalt of arsenic, and is reserved for further treatment as desired. The effluent will be substantially free from dissolved oxysalts, and can be used as indicated for the solution of further quantities of the oxysalt mixture.

While by way of illustration I have described the invention in connection with the preferred methods above detailed, it will be obvious to those skilled in the art, after understanding the foregoing, that various changes and modifications may be made without departing from the spirit or scope of the invention, and I aim in the appended claims to cover all such modifications and changes.

What I claim as new, and desire to secure by Letters Patent, is.

1. Method of separating sodium oxysalt of tin from a solution comprising caustic soda, stannate and a relatively small amount of arsenate, which comprises bringing the solution to such a concentration that the oxysalt of tin is for the most part insoluble therein whilst most of the arsenate remains soluble, and then separating the oxysalt of tin from the solution.

2. Method of separating sodium oxysalt of tin from a solution comprising caustic soda, stannate and arsenate, which comprises bringing the solution to such a concentration that the oxysalt of tin is for the most part insoluble in the solution whilst hot, while substantially all of the arsenate remains soluble, then separating the insoluble stannate from the hot solution, at which time substantially all of the arsenate remains soluble.

3. Method of separating sodium oxysalts of antimony and tin from a solution comprising caustic soda, stannate, relatively small amounts of arsenate, and undissolved antimoniate, which comprises bringing the solution to such a concentration that the oxysalt of tin is for the most part insoluble therein whilst most of the arsenate remains soluble, and then separating from the solution the insoluble oxysalts of antimony and tin.

4. Method of separating sodium oxysalts of tin and arsenic from a solution comprising caustic soda, stannate and arsenate, which comprises bringing the solution to such a concentration that the oxysalt of tin is for the most part insoluble in the solution whilst hot, while substantially all of the arsenate remains soluble, separating the insoluble stannate from the hot solution at which time substantially all of the arsenate remains soluble, then diluting the remaining solution to a concentration at which the arsenate will separate out when the solution is cooled, and cooling the solution and separating the arsenic therefrom.

5. Method of separating sodium oxysalts of tin and arsenic from a solution comprising caustic soda, sodium oxysalt of tin present in an appreciable quantity in the presence of some arsenate, which comprises bringing the solution to a concentration at which the stannate is for the most part insoluble in the solution while hot, separating such stannate and the diluting the remaining liquid to a degree of concentration at which the whole of the oxysalt of arsenic and any remaining stannate will crystallize out when the liquid is cooled, and then cooling the liquid and separating such last crystals therefrom.

6. Method according to claim 1 wherein the concentration for the separation of the oxysalt of tin is such as corresponds to about 508 grams of free caustic soda per litre of liquor if sodium chloride is absent from the solution.

7. Method as claimed in claim 1 wherein the solution contains sodium chloride to satuation and the concentration for separating the oxysalt of tin is such as corresponds to about 400 grams of free caustic soda per litre.

8. Method of separating oxysalts of tin and arsenic from a solution comprising caustic soda, stannate and arsenate, which comprises bringing the solution to such a concentration that one of said oxysalts due to its insolubility therein at such concentration will crystallize whilst the other oxysalt remains soluble therein, separating the insoluble oxysalt from the solution, then bringing the remaining solution to a different concentration such that the other oxysalt is insoluble therein, and separating said last oxysalt from said remaining solution.

9. Method as claimed in claim 8 wherein the concentration for the separation of the oxysalt of tin is such as corresponds to about 508 grams of free caustic soda per litre of liquor if sodium chloride is absent from the solution, and as corresponds to about 400 grams of free caustic soda per litre if sodium chloride is present in the solution to saturation.

In testimony whereof I have signed my name to this specification.

HENRY HARRIS.